United States Patent [19]

Iida

[11] Patent Number: 4,859,321

[45] Date of Patent: Aug. 22, 1989

[54] AERATION TYPE WATER TREATING DEVICE

[76] Inventor: Katumi Iida, 2-2, Hamada-cho, Yokkaichi-shi, MIE, Japan

[21] Appl. No.: 137,860

[22] PCT Filed: Mar. 30, 1987

[86] PCT No.: PCT/JP87/00195

§ 371 Date: Nov. 30, 1987

§ 102(e) Date: Nov. 30, 1987

[87] PCT Pub. No.: WO87/05892

PCT Pub. Date: Oct. 8, 1987

[30] Foreign Application Priority Data

Apr. 1, 1986 [JP] Japan .................. 61-074521
Apr. 18, 1986 [JP] Japan .................. 61-089737
Jun. 9, 1986 [JP] Japan .................. 61-132951

[51] Int. Cl.⁴ .............................................. C02F 3/06
[52] U.S. Cl. ................................... 210/150; 261/123
[58] Field of Search ........................ 210/615–618, 210/150, 151; 261/123

[56] References Cited

U.S. PATENT DOCUMENTS

| | | | |
|---|---|---|---|
| 3,402,125 | 9/1968 | Tanaka | 210/615 |
| 3,773,660 | 11/1973 | Hopwood | 210/617 |
| 4,364,826 | 12/1982 | Kato | 210/150 |
| 4,416,993 | 11/1983 | McKeown | 210/615 X |
| 4,680,111 | 7/1987 | Veda | 210/615 X |

FOREIGN PATENT DOCUMENTS

| | | |
|---|---|---|
| 50-41355 | 4/1975 | Japan . |
| 51-53757 | 5/1976 | Japan . |
| 51-59451 | 5/1976 | Japan . |
| 56-24095 | 3/1981 | Japan . |
| 58-28000 | 6/1983 | Japan . |
| 58-54638 | 12/1983 | Japan . |

Primary Examiner—Tom Wyse
Attorney, Agent, or Firm—Armstrong, Nikaido, Marmelstein, Kubovcik & Murray

[57] ABSTRACT

In a water treating device with a water wheel (3) arranged on upper side of an immersion filter bed (4) for performing surface aeration, the immersion filter bed (4) is composed of a plurality of filter bed elements (4a), (4b) including a net-shaped substance (5) as main element, which elements (4a), (4b) are stood in parallel or laminated. In this constitution, the microorganisms are adhered and activated throughout the whole filter bed, and closing due to waste substances is not easily produced, thereby the water treating efficiency is significantly improved.

3 Claims, 7 Drawing Sheets

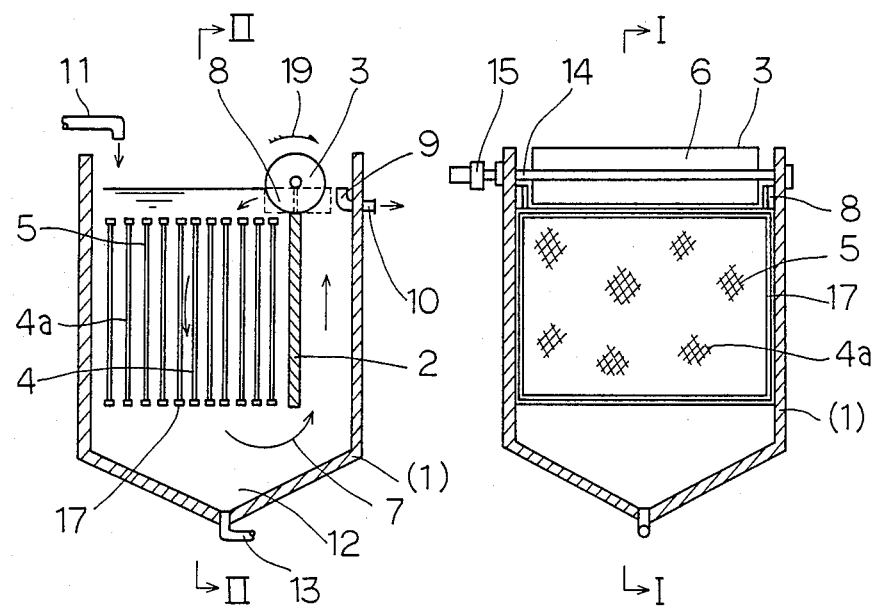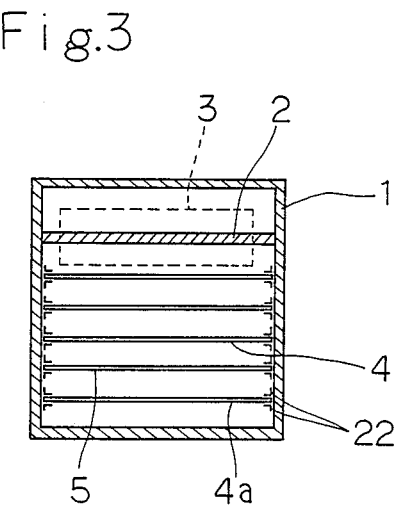

AERATION TYPE WATER TREATING DEVICE

Technical Field

The present invention relates to a water treating device having a water wheel arranged on upper side of an immersion filter bed so as to perform surface aeration, which device can be used in treatment of not only industrial wastewaters but also sewage water exhausted from hospitals, offices, houses or the like.

BACKGROUND ART

A water treating device of above-mentioned type in the prior art is disclosed, for example, in Japanese patent publication No. 54638/1983.

The water treating device is constituted in that a water wheel is rotatably fixed on upper side of a treating tank, a circulation partitioning plate with lower side opened is installed from just below a water raking-out member of the water wheel throughout the whole width region of the treating tank, the water level is adjusted so that a part of the water raking-out member of the water wheel is sunk in the water, water circulation is generated from the circulation partitioning plate as the border by rotating the water wheel, and an immersion filter bed is arranged at least on one side of the circulation partitioning plate.

The immersion filter bed is formed by contact materials such as Rasching ring, plastic short tubes in net shape or small stones (gravel), filled or suspended.

In the filter bed constituted by the contact materials, however, if the specific gravity of the contact material is more than 1.0, the voidage is gradually decreased towards the bottom of the treating tank. On the other hand, if the specific gravity is less than 1.0, the voidage is gradually decreased towards the top of the treating tank. Consequently, it is difficult to obtain the contact flow of suitable rate for adhering and activation of microorganisms (If too slow, the microorganisms cannot be adhered; if too rapid, oxygen supply becomes insufficient), and to secure the voidage which cannot be closed by flocks or waste throughout the whole filter bed. If closing of the immersion filter bed is produced, the filter bed must be washed. However, the washing is troublesome and not preferable because the microorganisms are washed away (Time is required for the microorganisms to be adhered to the filter bed again).

DISCLOSURE OF INVENTION

The invention consists in a water treating device wherein a water wheel is arranged on upper side of an immersion filter bed so as to perform surface aeration, characterized in that the immersion filter bed is composed of a plurality of filter bed elements including net-shaped substance as main element, stood in parallel or laminated.

According to the feature, in the invention, the contact flow having suitable rate to adhere the microorganisms to the filter bed and activate them can be obtained throughout the whole filter bed, and the voidage which is not easily closed by flocks or water can be secured throughout the whole filter bed. Consequently, the wastewater treating efficiency per unit capacity of filter bed is significantly improved and the water treating tank can be made compact.

BRIEF DESCRIPTION OF DRAWINGS

FIG. 1 is a sectional view illustrating a first embodiment of the invention taken in line I—I of FIG. 2;
FIG. 2 is a sectional view taken in line II—II of FIG. 1;
FIG. 3 is a plan view of FIG. 1.

BEST MODE FOR CARRYING OUT THE INVENTION

Figure 4:
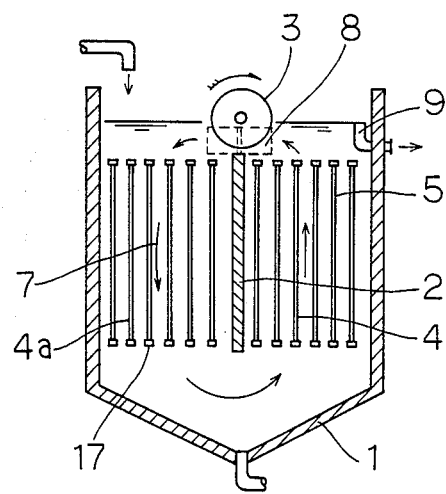
FIG. 4 is a sectional view illustrating a modification of the first embodiment of the invention.

In an embodiment shown in FIGS. 1-3, a water wheel 3 is fixed horizontally on upper side of a treating tank 1, a circulation partitioning plate 2 is installed from position just below a water raking-out member 6 of the water wheel 3 towards the bottom of the treating tank 1 and spaced from the bottom of the treating tank 1 by a gap being about 10–30% of the longitudinal length of the circulation partitioning plate 2, and water raked out by the water raking-out member 6 during rotation of the water wheel 3 cannot be returned through a gap between the water wheel 3 and a tank wall due to a reverse flow inhibiting plate 8 to prevent the returning. Also the water cannot be returned through a small gap between lower side of the water wheeel 3 and the top of the circulation partitioning plate 2 due to water urged one by one by the raking-out member 6 being rotated while the water wheel 3 is rotated. Consequently, since the water level is elevated at receiving side of the raked-out water and lowered at delivering side of the raked-out water, the raked-out water is returned through an opening at the bottom of the circulation partitioning plate 2 thereby circulation flow 7 is produced within the treating tank 1. A number of filter bed elements 4a, 4b are installed on one side of the circulation partitioning plate 2 in the treating tank 1 and spaced from each other by a definite distance corresponding to the sewage load so as to constitute an immersion filter bed 4.

In this constitution, the contact oxidation is performed repeatedly by the circulation flow.

Figure 5:
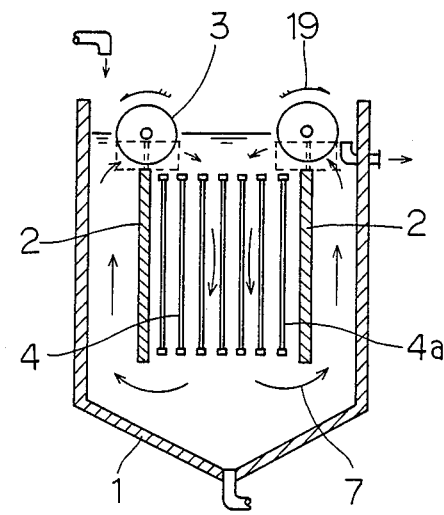
FIG. 5 is a sectional view illustrating another modification of the first embodiment of the invention.

Position of installing the immersion filter bed 4 in the treating tank 1 is not limited to the above-mentioned position, but the immersion filter bed 4 may be formed on both sides of the circulation partitioning plate 2 as shown in FIG. 4 (suitable for the sewage treatment at relatively low concentration), or a plurality of water wheels 3 may be installed on boths sides in the treating tank 1 and the immersion filter bed 4 may be provided between the circulation partitioning plate 2 on both sides as shown in FIG. 5 (suitable for the sewage treatment at high concentration requiring much circulation flow 7 by aeration).

Figure 6:
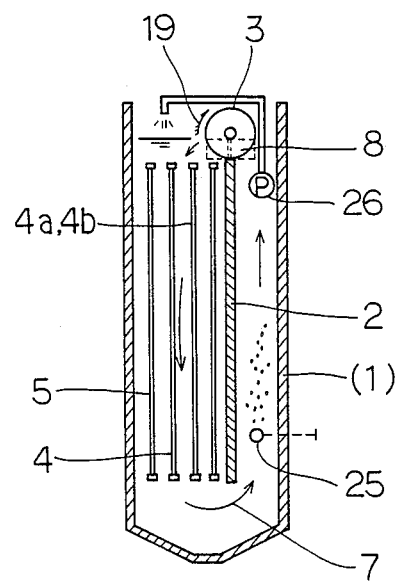
FIG. 6 is a sectional view illustrating a second embodiment of the invention.

In FIG. 6, the treating tank 1 is made deep and the circulation partitioning plate 2 is made long, thereby the treating tank 1 with large capacity at small installation area may be formed (very effective at little space). In the case of the sewage of high concentration, if the mounting number of water wheels is limited due to the installation space and the quantity of the circulation flow 7 by aeration seems little, the quantity will be increased by increasing the rotational speed of the water wheels. However, if more quantity is required, as shown in FIG. 6, auxiliary aeration may be performed at side without installation of the immersion filter bed 4 using an air scattering tube 25, or a circulating pump 26 may be installed and water sprinkling aeration be performed to side where water is raked out by the water wheel 3 thereby the circulation flow rate is increased and the deep shaft system can be performed. The circulating pump 26 may be an water-immersible propeller pump or a vertical pump being a pump of larger water amount at low lift and having energy saving property and much outgoing amount.

Next, installation mode of the filter bed elements 4a, 4b to the treating tank will be described.

Figure 7:
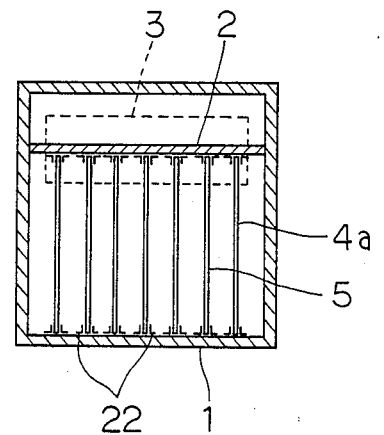
FIG. 7 is a plan view illustrating a third embodiment of the invention.
Figure 8:
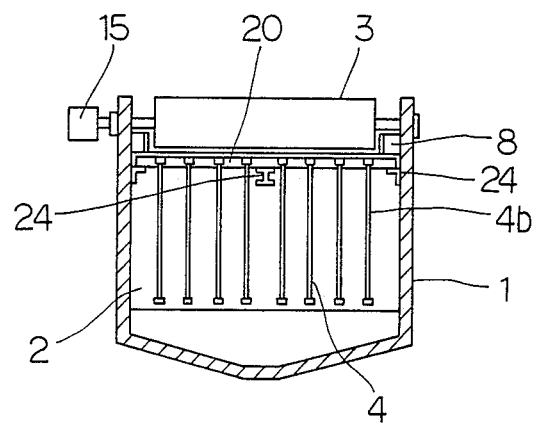
FIG. 8 is a sectional view of FIG. 7.
Figure 9:
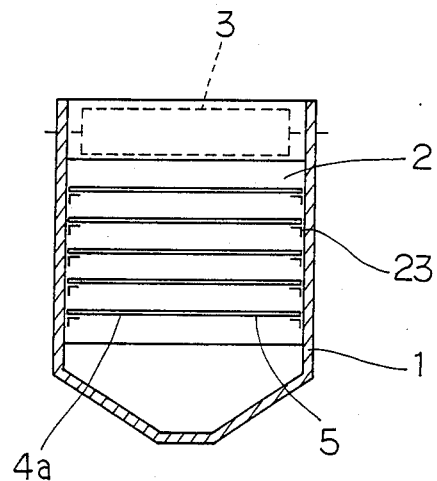
FIG. 9 is a sectional view illustrating a fourth embodiment of the invention.

The filter bed elements 4a, 4b may be vertically installed in parallel to the circulation partitioning plate 2 as shown in FIGS. 1-6, vertically installed in perpendicular to the circulation partitioning plate 2 as shown in FIGS. 7-8, or horizontally installed in perpendicular to the circulation partitioning plate 2 as shown in FIG. 9.

The installation method of FIG. 9 is suitable for tertiary treatment of the sewage of low concentration and purification of water of little load such as orginal water in a water supply business, but the vertical installation with a definite spacing is preferable in the case of the sewage treatment of medium or high concentration.

Installation of the filter bed elements 4a to the treating tank 1 may be performed by fixing them one by one to the treating tank 1, but as shown in FIG. 3 and FIG. 7, method of installing slide frames 22 to the treating tank 1 and fitting the filter bed elements 4a thereto by falling is simple and preferable. When the filter bed elements 4a are installed horizontally as shown in FIG. 9, the filter bed elements 4a may be supported by a receptable 23 of lack type.

Figure 10:
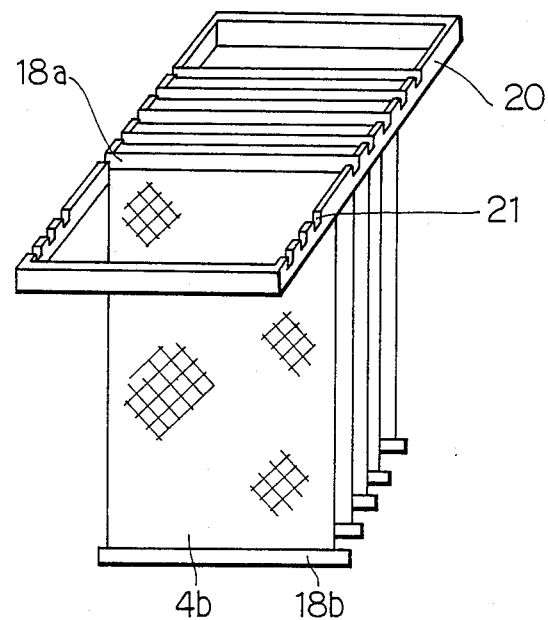
FIG. 10 is a perspective view of an immersion filter bed with filter bed elements suspended.

As shown in FIG. 10, when the filter bed elements 4b each mounted through an upper support bar 18a are fitted respectively to a number of slits 21 of a filter bed element suspending frame 20 and hung down so as to constitute the immersion filter bed 4, the filter bed element suspending frame 20 may be supported by a receptacle support tool 24 attached to the treating tank 1 as shown in FIG. 8.

Figure 11:
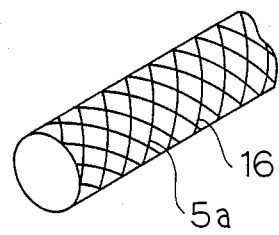
FIG. 11 is a perspective view of a net tube as a first example of net-shaped substances to be used in the invention.
Figure 12:
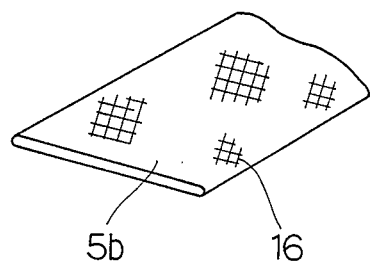
FIG. 12 is a perspective view of a flat net tube as another example of net-shaped substances.
Figure 13:
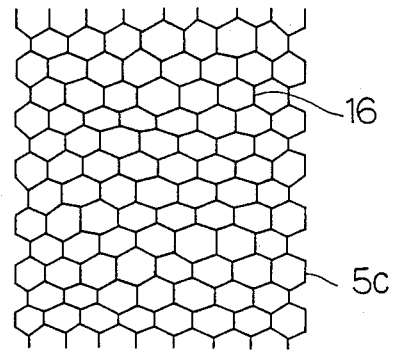
FIG. 13 is a front view of a fishing net as another example of net-shaped substances.
Figure 14:
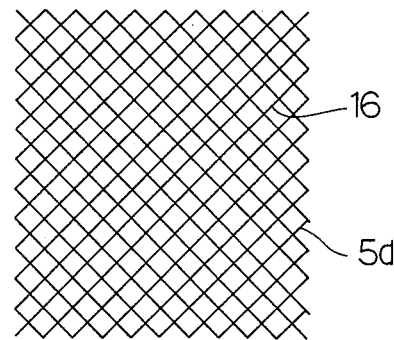
FIG. 14 is a front view of a net sheet as another example of net-shaped substances.

In a method that a net-shaped substance 5 such as a cylindrical net tube 5a (FIG. 11), a flat net tube 5b (FIG. 12), a fishing net 5c (FIG. 13) or a net sheet 5d (FIG. 14) is used as basic member of the filter bed element 4a and spread on a filter bed element support frame 17, four ends of the net-shaped substance may be fixed using pressing plates, screws or the like, the net-shaped substance may be wrapped to the frame 17 and bonded, or the net-shaped substance may be fixed to the frame 17 using string-shaped substance such as wire by knitting.

Figure 15:
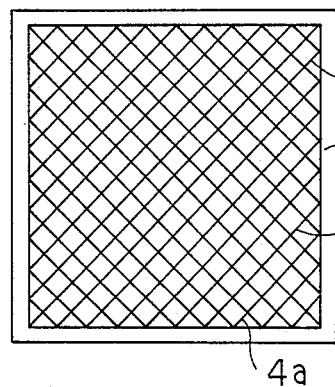
FIG. 15 is a front view illustrating an example of filter bed elements to be used in the invention.
Figure 16:
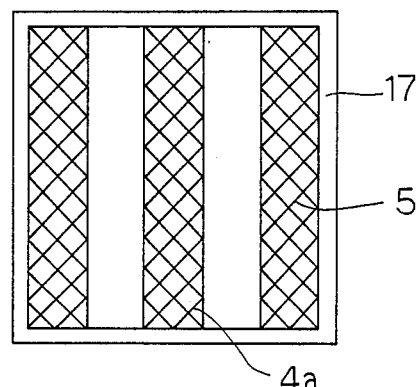
FIG. 16 is a front view illustrating another example of filter bed elements.
Figure 17:
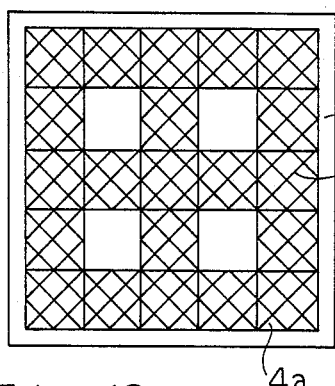
FIG. 17 is a front view illustrating another example of filter bed elements.

Concrete modes of the installation are shown in FIGS. 15-17.

FIG. 15 shows an example of the filter bed element 4a where the net-shaped substance 5 is mounted to the filter bed element support frame 17;

FIG. 16 shows another example of the filter bed element 4a where the net-shaped substance 5 is mounted to the filter bed element support frame 17 at a definite spacing; and FIG. 17 shows still another example of the filter bed element 4a where the net-shaped substance 5 is mounted to the filter bed element support frame 17 at cross Zig-Zag form.

Figure 19:
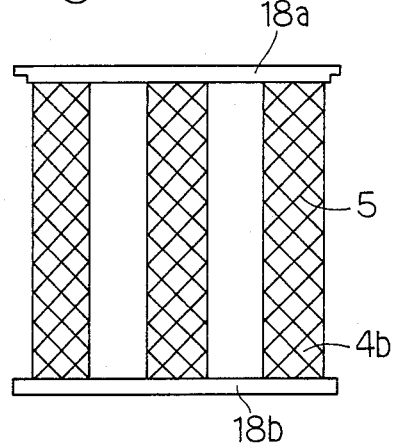
FIG. 19 is a front view illustrating another example of filter bed elements.
Figure 20:
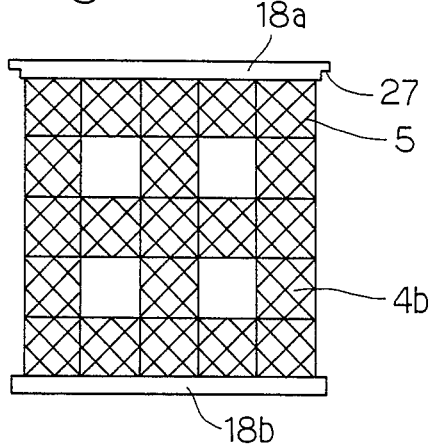
FIG. 20 is a front view illustrating another example of filter bed elements.

In the case of the filter bed element 4b of suspension type, as shown in FIGS. 19-20, the new-shaped substance 5 is wrapped and returned on the upper support bar 18a with notched portions 27 provided on both ends, and the contact part is bonded or bound by knitting using a string-shaped substance such as wire or fixed using a pressing plate and a screw. The lower end of the net-shaped substance 5 is mounted to the lower support bar 18b in similar manner to the upper end.

Figure 18:
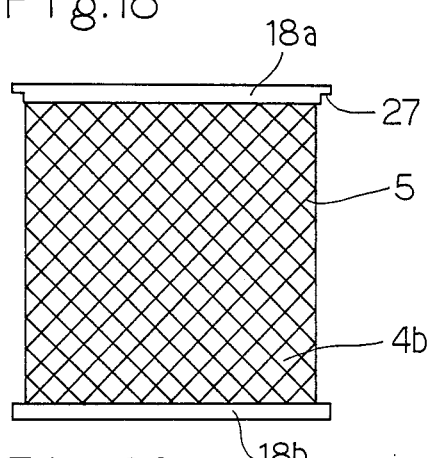
FIG. 18 is a front view illustrating another example of filter bed elements.

Concrete modes of the installation are shown in FIGS. 18-20.

FIG. 18 shows an example of the filter bed element 4b where the net-shaped substance 5 is installed to the filter bed element support bars 18a, 18b throughout the whole surface;

FIG. 19 shows another example of the filter bed element 4b where the net-shaped substance 5 is installed to the filter bed element support bars 18a, 18b at a definite spacing; and FIG. 20 shows still another example of the filter bed element 4b where the net-shaped substance 5 is installed to the filter bed element support bars 18a, 18b at Zig-Zag lattice form.

The filter bed support frame 17, the suspension frame 20 and the filter bed element support bars 18a, 18b are preferably made of iron or stainless steel on account of workability, strength and low cost. The lower support bar 18b serves also as a weight.

The net tube 5a has diameter of 5 cm-20 cm, thickness of the net element wire 16 being 5 mm-10 mm, and size of each mesh being about 30 mm-80 mm. Since the net tube 5a is of pipe form, it is stout and suitable for the treatment at high concentration. The flat net tube 5b is 5 cm-20 cm wide and 5 mm-15 mm thick, and has thickness of the net element wire being 0.5 mm-2 mm and size of each mesh being about 3 mm-15 mm. Even when the net of the flat net tube 5b is composed of the thin element wires 16, it has strength on account of double structure due to the flat pipe form. The fishing net 5c preferably has thickness of the element wire 16 being 2 mm-4 mm and size of each mesh being about 20 mm-60 mm.

The flat net tube 5b is better from the viewpoints of strength, amount of the material in use, price amd machining into the filter bed elements 4a, 4b during the net manufacturing, and can be manufactured in mass production by extrusion molding and has strength even using the thin element wires 16 and can be used widely for the treatment of the sewage from low concentration to high concentration. Since a number of the net tubes each being as narrow as 5 cm-20 cm are set to the filter bed elements 4a, 4b, each tube is independent and can be fluttered even by pressure of the water flow and the contact efficiency to the microorganisms is increased corresponding to the movement even if it is slight.

Figure 21:
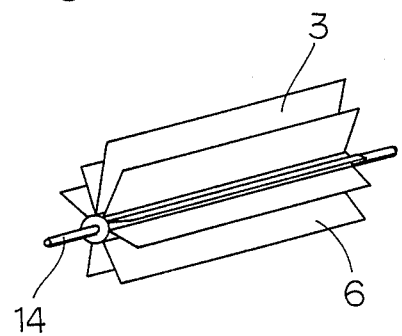
FIG. 21 is a perspective view illustrating an example of water wheels to be used in the invention.
Figure 22:
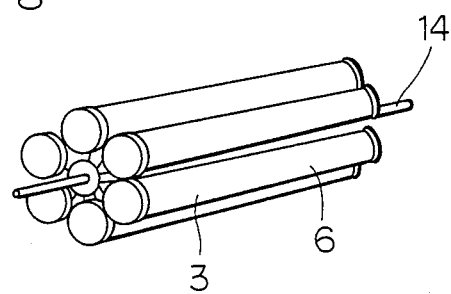
FIG. 22 is a perspective view illustrating another example of water wheels.
Figure 23:
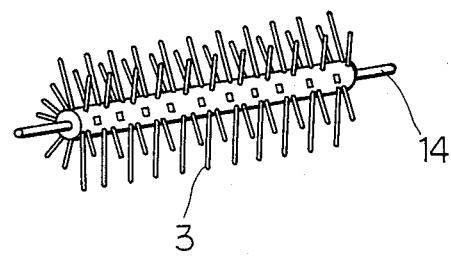
FIG. 23 is a perspective view illustrating another example of water wheels.

Next, modes of water wheels to be used in the invention are shown in FIGS. 21-23.

FIG. 21 shows an example of the water wheel where the water raking-out members 6 are of plate form;

FIG. 22 shows another example of the water wheel where the water raking-out members 6 are of tubular form; and FIG. 23 shows still another example of the water wheel where the water raking-out members 6 are of comb-like form extending radially.

Use modes in the above-mentioned embodiments will now be described.

In the invention, the energy-saving water wheel of low speed rotation (peripheral speed of 30-60 m/minute) rakes out the large water quantity throughout the overall length of the raking-out members 6 of the water wheel, and the circulation flow 7 of the large water quantity by aeration is produced from the circulation partitioning plate 2 as the border for the contact oxidation. In this constitution, the circulation flow rate is significantly large in comparison to that by an air lift, and therefore the circulation water paths large in number and width are required and the dead space of the immersion filter bed 4 becomes little, thereby the contact efficiency to the microorganisms becomes will correspondingly.

If the raking-out member 6 of the water wheel is formed by a porous plate or a porous tube with large surface area, during the rotation, a thin water film is dropped on the surface of the raking-out member 6 and exposed to the air thereby oxygen in the air is dissolved in the water. On the contrary, since organic substance in the water is radiated into the air by the exposure, the substitution action can be effected although it is impossible in the aeration using a blower or a compressor.

The net tubes 5a, 5b and the net sheet 5d as basic substance for the filter bed elements 4a, 4b of the immersion filter bed 4 to be used in the invention can be manufactured in mass production at low cost as extrusion molding products of polyethylene resin or polypropylene resin, thereby the net tube having the net element wire 16 being thin or thick and the mesh being fine or coarse can be freely selected depending on the sewage load, Even if the resin net is broken at one position, the breakage is not spread. The resin net is used also as a net for stopping sand and is very strong, and the water flow can pass in any direction horizontally and vertically due to the mesh structure and the contact efficiency is well.

Respective spacings of the filter bed elements 4a, 4b are selected to 30 mm-100 mm depending on the water load to be treated, i,e., the contact area load. In the case of the sewage treatment at low concentration, since the contact area load is little, the contact area is required much and therefore the net-shaped substance 5 with fine mesh is used and the filter bed elements 4a, 4b are installed at the narrowed spacing. In the case of the treatment at high concentration, since the contact area load can be taken much, the mesh may be coarse and the spacing of the filter bed elements 4a, 4b may be wide. Since the raw material for the mesh-shaped substance 5 is a net, the contact area per unit volume is very large. Consequently, even if the immersion filter bed 4 is installed in a small treating tank, since the contact area is large and the circulation flow 7 subjected to aeration is much, the treating tank being very compact in comparison to other can be designed. If there is a treating tank 1 already installed, a circulation partitioning plate 2 matched to the tank 1 may be fallen and fixed thereto and the water wheel 3 may be installed on upper side. In this state, if the filter bed element 4a is fallen or the filter bed element 4b of suspension type is hung, the treating tank 1 already installed can be reconstructed simply. Particularly the reconstruction of the standard activation sludge method results in the significant energy saving in comparison to the blower aeration. Since the contact oxidation by the net-shaped substance 5 is performed, in the interior of the microorganism film adhered to the bed, the aerobic digestion and the anaerobic self-digestion are promoted by the circulation flow 7 subjected to aeration, thereby the excessive sludge is significantly decreased and the treatment water quantity is significantly increased.

Since the filter bed elements 4a, 4b are installed in the circulation water flow paths of the treating tank 1 at a definite spacing, the closing obstruction of the immersion filter bed 4 as a whole cannot occur but water urged by the raking-out member 6 of the water wheel always becomes pulse flow. The filter bed elements 4a, 4b are oscillated by the pulse circulation flow 7, and the contact efficiency between the microorganisms and the sewage is increased. In the microorganism film with the weakened activity, due to the oxygen moving by the circulation flow from the interior of the film, the activation of the aerobic bacteria is usually increased and the digestion of sludge is promoted. Natural separation occurs in a large mass from meshes of the net-shaped substance 5, and sedimentation occurs between the filter bed elements 4a, 4b. Since deposit to the sludge deposit portion 12 occurs, washing of the immersion filter bed 4 is not required but the excessive sludge in the deposit portion may be regularly exhausted by a sludge exhaust tube 13.

The natural separation occurs with time lapse in some positions among a number of the net-shaped substances 5 in the immersion filter bed 4. Since the circulation flow 7 is well, new microorganisms are immediately adhered to the bed where the separation occured, thereby variation of the water quality due to the natural separation of the microorganisms does not occur. Artificial treatment such as washing is not applied to the immersion filter bed 4 of the treating tank 1 at any time, but the microorganisms environment is always held to the definite condition in the natural state thereby the stable treatment water can be always obtained.

If a water immersible air scattering tube is arranged in place of the water wheel in each embodiment of the invention, although effects of the invention cannot be fully achieved, this constitution can be used as a water treatment device having good water treating efficiency in comparison to the prior art.

It the water wheel is omitted in each embodiment of the invention, the device can be used also as a deposit tank.

What is claimed is:

1. An aeration type water treating device comprising:
    a treating tank,
    an immersion filter bed in said tank composed of a plurality of filter bed elements each including a flat net tube as a main element, and means for vertically positioning said bed elements in parallel,
    a water wheel rotatably fixed on an upper side of said tank for performing surface aeration and having at least one water raking out member,
    a circulation partitioning plate with lower side open installed from a position just below the at least one water raking out member of the water wheel across the whole width of said tank, and
    means for adjusting the water level in the tank so that a part of the water raking out member is sunk in the water while circulation flow is produced from said circulation partitioning plate as the border by rotating the water wheel,
    said immersion filter bed being arranged at least on one side of said circulation partitioning plate.

2. An aeration type water treating device as set forth in claim 1, wherein said net tube is a product by extrusion of plastics.

3. An aeration type water treating device as set forth in claim 1, wherein said immersion filter bed is composed of a plurality of said filter bed elements suspended.

* * * * *